Jan. 8, 1957
M. WALTER
2,776,572
TRANSMISSION FOR MOTOR VEHICLES
Filed Jan. 26, 1953
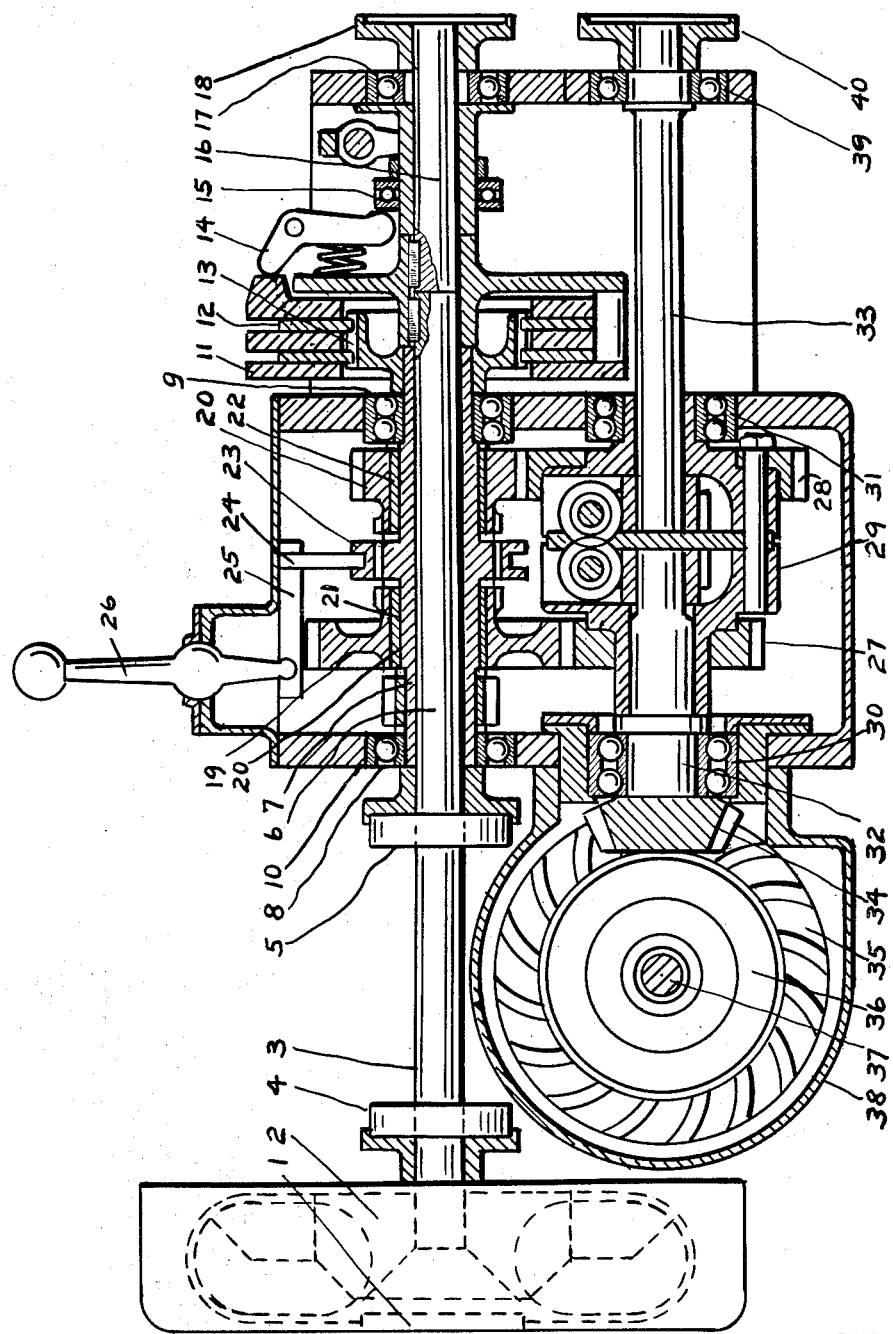
INVENTOR.
Maurice Walter
BY Robert S. Dunham
ATTORNEY

United States Patent Office 2,776,572
Patented Jan. 8, 1957

2,776,572
TRANSMISSION FOR MOTOR VEHICLES

Maurice Walter, Lawrence, N. Y.

Application January 26, 1953, Serial No. 333,185

2 Claims. (Cl. 74—15.63)

This invention has for its general objects the provision of an improved transmission for motor vehicles to provide (1) a more compact construction, (2) light weight, (3) greater torque capacity and efficiency, (4) improved accessibility permitting easier replacement, and (5) an improved friction clutch disposed in a novel location to provide improved cooling and greater accessibility for adjustment, repair and replacement.

Another object is to provide a novel transmission with improved drive for auxiliary equipment such as pumps or winches. The drive can be engaged independently when desired and the drive for such auxiliary equipment will not be interrupted when the friction clutch is disengaged for the purpose of engaging or disengaging transmission drive gears.

Another object is to provide a transmission which is well adapted for multiple axle or wheel driving, including the provision of center or interaxle differential unit. Such unit is incorporated directly in the transmission so that the use of a separate transfer unit can be dispensed with.

According to the present invention the foregoing objects and advantages are attained by providing a single hollow transmission shaft adapted to drive the driving gears of the transmission. A clutch driving shaft extends through this hollow shaft which, at the end remote or opposite the power input end, is provided with a friction clutch to couple the transmission shaft for drive from the friction clutch shaft. A counter or output shaft is incorporated in the transmission and on the shaft there is a differential structure with driven gears driven by the driving gears on the hollow transmission shaft. The end of the countershaft carries a bevel pinion which drives a cross bevel gear driving assembly.

In the drawings:

The figure shows a longitudinal sectional view of my improved transmission.

In the drawing 1 designates the engine crankshaft or flywheel flange. Drive from this flange may be taken through the hydraulic torque converter 2 to the driving shaft 3, which may be provided with universal joints or aligned couplings 4 and 5. Power drive is finally imparted to a clutch driving shaft 6 which extends through a single hollow transmission shaft 7. Suitable bearings 8 and 9 permit rotation of the transmission shaft 7 in the transmission case 10. A friction clutch generally designated 11 provides for a disengageable driving connection between the clutch driving shaft 6 and the hollow transmission shaft 7. The friction clutch 11 is on the opposite end of the clutch shaft from the power input end.

The friction clutch is preferably of the disc type with the lighter discs 12 driving the hollow transmission shaft 7 through clutch hub disc 13. Accordingly the inertia or spinning effect is minimized when the pressure on the clutch discs 12 is relieved by the clutch levers 14 by pressure applied in the usual way to pressure or release bearing 15. The clutch hub 13 is suitably keyed or otherwise secured to the transmission shaft 7.

16 denotes a clutch driving shaft extension which may be supported by bearing 17 and provided with a suitable drive flange 18 which may provide continuous through drive at engine speeds for driving pumps or other equipment. This drive is not interrupted when the friction clutch is disengaged upon gear changing or shift operations. Shaft 6 and extension shaft 16 are preferably keyed or splined to clutch 11.

The transmission driving gears 19 and 20 are preferably of the constant mesh type and are provided with bushings 21 and 22 for mounting them on the hollow transmission shaft 7. The drive gears are selectively engaged or coupled to the main hollow transmission shaft by sliding pocket gear clutch member 23. Such gear clutch member can be shifted by shifter fork 24 mounted on shifter bar 25 which is in turn operated by shifter lever 26.

The driving gears 19 and 20, which are of different gear ratios, respectively engage driven gears 27 and 28 which are rigidly mounted on the center differential 29, which is in turn mounted in bearings 30 and 31 supported on the transmission case 10.

The center differential 29 divides the power to power output countershafts 32 and 33. One of the power output countershafts, i. e. 32, may be provided with a bevel pinion 34 adapted to drive the bevel crown gear 35 and the differential 36 which has cross driving shafts 37 (one of which is here shown) adapted for connection to the driving wheels of the vehicle. This portion of the device may be termed a cross bevel gear drive and differential assembly. Such assembly is mounted in a housing 38 bolted to the transmission case or housing 10.

The other center differential power output shaft 33 extends beyond the friction clutch 11 and can be supported by a bearing 39 and provided with a driving flange to provide drive for the other drive axle or axles of the vehicles.

Obviously if driving on only a single axle is required, the torque proportioning center differential 29 can be omitted and the transmission-driven, power output countershaft gears can be directly mounted on a single through shaft.

From the foregoing the advantages of my transmission will be readily understood. It is obvious that output drive may be taken from either end of the transmission. The transmission is most compact and may provide for great torque or power capacity with simplicity, light weight and high driving efficiency at all speeds. There need only be one gear contact for each speed. The friction clutch cools better because it is located away from the engine and engine heat. The clutch is more accessible for inspection, adjustment or replacement as it is not between the engine and transmission but is at the other end of the transmission opposite from the power input end. The clutch may be removed or replaced without removing the transmission from the vehicle.

The transmission also provides a center differential for multiple axle or wheel driving without requiring a separate transfer unit and also provides for the direct cross drive to one of the driving axles.

The transmission is readily adaptable for front engine driving directly to the front wheels or for rear engine driving directly to the rear wheels.

What is claimed is:

1. A transmission for a motor vehicle having two separately driven tractive means, comprising in combination, a single hollow transmission shaft, a clutch driving shaft extending through the hollow transmission shaft, means mechanically connected to one end of said driving shaft for transmitting mechanical power thereto, a friction clutch disposed adjacent to the other end of said driving shaft for coupling said other end of said clutch driving shaft to said single hollow transmission shaft, output counter shafting means, a plurality of driven gears carried by said counter shafting means, a power dividing differential located within the confines of said transmission and between said driven gears, selectively operable multiple driving gears of different ratios mounted on and selectively driven by said hollow transmission shaft for cooperation with the aforesaid driven gears to drive said driven gears at various speed ratios, and means positively mechanically driven from said differential for driving said tractive means respectively.

2. A transmission for a motor vehicle in accordance with claim 1, in which said clutch driving shaft includes a portion rigid therewith and extending beyond said clutch, said portion being adapted for connection to a power driven device requiring a power drive uninterrupted by said clutch and by the demands for tractive power for the motor vehicle.

References Cited in the file of this patent

UNITED STATES PATENTS

| | | |
|---|---|---|
| 1,334,325 | Sternberg | Mar. 23, 1920 |
| 1,654,924 | Douglas | Jan. 3, 1928 |
| 2,399,201 | Buckendale | Apr. 30, 1946 |
| 2,448,822 | Pinardi | Sept. 7, 1948 |